(12) United States Patent
Grimes et al.

(10) Patent No.: US 11,816,079 B2
(45) Date of Patent: Nov. 14, 2023

(54) DECISION IMPLEMENTATION WITH INTEGRATED DATA QUALITY MONITORING

(71) Applicant: Capital One Services, LLC, McLean, VA (US)

(72) Inventors: Thomas Grimes, Arlington, VA (US); Kenneth Wydler, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 74 days.

(21) Appl. No.: 17/359,849

(22) Filed: Jun. 28, 2021

(65) Prior Publication Data
US 2022/0414071 A1   Dec. 29, 2022

(51) Int. Cl.
| | | |
|---|---|---|
| G06F 16/00 | (2019.01) | |
| G06F 16/215 | (2019.01) | |
| G06N 20/00 | (2019.01) | |
| G06F 16/25 | (2019.01) | |
| H04L 67/50 | (2022.01) | |
| G06F 11/30 | (2006.01) | |
| G06F 11/34 | (2006.01) | |

(52) U.S. Cl.
CPC ........ *G06F 16/215* (2019.01); *G06F 11/3086* (2013.01); *G06F 11/3452* (2013.01); *G06F 16/258* (2019.01); *G06N 20/00* (2019.01); *H04L 67/535* (2022.05)

(58) Field of Classification Search
None
See application file for complete search history.

(56) References Cited

U.S. PATENT DOCUMENTS

| | | | |
|---|---|---|---|
| 7,219,131 B2 | 5/2007 | Banister et al. | |
| 10,997,662 B1 | 5/2021 | Warfel et al. | |
| 2014/0214637 A1 | 7/2014 | Pai | |
| 2018/0176164 A1 | 6/2018 | Agarwal et al. | |
| 2019/0347585 A1 | 11/2019 | Mowatt et al. | |

FOREIGN PATENT DOCUMENTS

| | | | | |
|---|---|---|---|---|
| CN | 101133564 A | * | 2/2008 | ............... H04B 3/46 |
| CN | 105009132 A | * | 10/2015 | ........... G06F 21/552 |

OTHER PUBLICATIONS

Translation of CN-105009132-A, "based on the confidence factor associated with the event", Oct. 2015, 8 pages. (Year: 2015).*
Translation of CN-101133564-A, "DSL state and line configuration control", Feb. 2008, 23 pages. (Year: 2008).*

* cited by examiner

*Primary Examiner* — Bai D Vu
(74) *Attorney, Agent, or Firm* — Bookoff McAndrews, PLLC

(57) ABSTRACT

Computer-implemented methods and systems include downstream execution for individual rule-based flagging of upstream data quality errors by receiving upstream data from a plurality of sources, identifying a downstream task to be executed, applying a plurality of rules to the upstream data, generating a plurality of outputs including at least one output for each of the plurality of rules applied to the upstream data, each of the plurality of outputs being associated with a corresponding rule of the plurality of rules, identifying a tagged population based on the plurality of outputs, determining that at least one of the plurality of outputs does not meet a corresponding rule threshold, and activating the downstream execution for the tagged population after at least one of (i) updating the corresponding rule threshold or (ii) overriding an error.

20 Claims, 11 Drawing Sheets

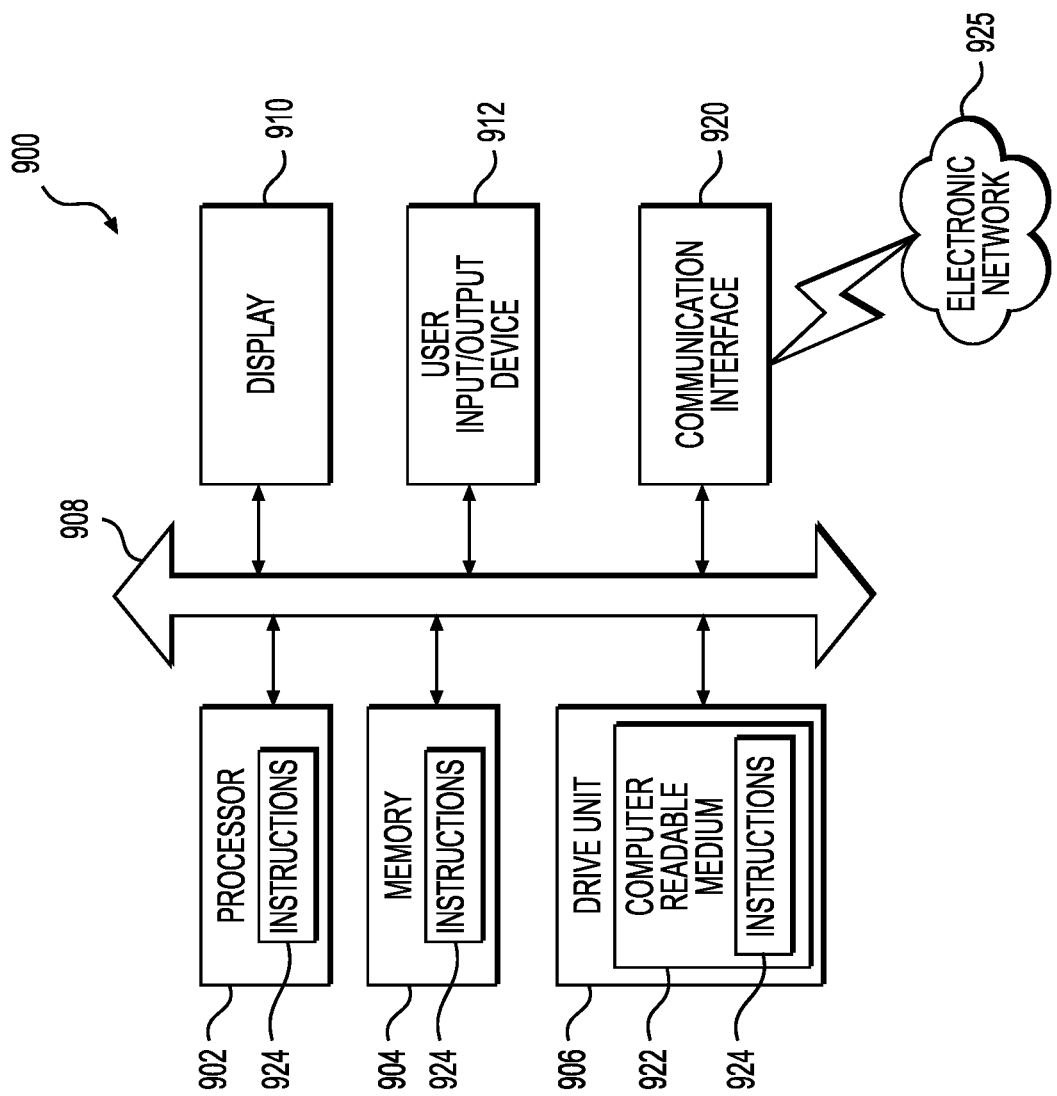

DECISION IMPLEMENTATION WITH INTEGRATED DATA QUALITY MONITORING

TECHNICAL FIELD

Various embodiments of the present disclosure relate generally to performing downstream tasks for populations, and more particularly, systems and methods for individual rule-based flagging of upstream data quality errors.

BACKGROUND

Large amounts of data may be obtained from various sources and may be processed using one or more rules and/or policies to be output for a given use. Processing the data may be done in a manner that limits or otherwise modifies the large amounts of data without allowing individual rule-based flagging of low quality or incorrect data. Such processing may limit the use of the data, limit error detection in the various sources, and/or result in unintended results.

The present disclosure is directed to addressing one or more of the above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for downstream execution with individual rule-based flagging of upstream data quality errors and include receiving upstream data, corresponding to an overall population of users, from a plurality of sources each source selected from one of a relational database, a non-relational database, or a file system, identifying a downstream task to be executed, the downstream task being associated with at least a portion of the overall population, applying a plurality of rules to the upstream data, generating a plurality of outputs including at least one output for each of the plurality of rules applied to the upstream data, each of the plurality of outputs being associated with a corresponding rule of the plurality of rules, identifying a tagged population based on the plurality of outputs, the tagged population being a subset of the overall population, determining that at least one of the plurality of outputs does not meet a corresponding rule threshold, and activating the downstream execution for the tagged population after at least one of (i) updating the corresponding rule threshold or (ii) overriding an error generated based on the determining that the at least one of the plurality of outputs does not meeting the threshold.

In another aspect, an exemplary embodiment of a computer-implemented method includes receiving source data from each of a plurality of sources each source selected from one of a relational database, a non-relational database, or a file system, identifying a downstream task to be executed, the downstream task being associated with at least a portion of an overall population, applying a plurality of rules to each of the source data from the plurality of sources, generating a plurality of outputs including at least one output for each of the plurality of rules applied to each of the source data, determining that at least one of the plurality of outputs from a first source of the plurality of sources does not meet a corresponding rule threshold, flagging the first source based on the at least one of the plurality outputs not meeting a corresponding rule threshold, identifying a plurality of usable sources from the plurality of sources, the usable sources excluding the first source, identifying a downstream task to be executed based on the source data from the usable sources, the downstream task being associated with an overall population, identifying a tagged population based on the plurality of outputs associated with the usable sources, the tagged population being a subset of the overall population, and activating the downstream execution for the tagged population.

In another aspect, a system includes a data storage device storing processor-readable instructions and a processor operatively connected to the data storage device and configured to execute the instructions to perform operations that include, receiving source data from each of a plurality of sources, each source selected from one of a relational database, a non-relational database, or a file system, applying a plurality of rules to each of the source data from the plurality of sources, generating a plurality of outputs including at least one output for each of the plurality of rules applied to each of the source data, determining that at least one of the plurality of outputs from a first source of the plurality of sources does not meet a corresponding rule threshold, flagging the first source based on the at least one of the plurality outputs not meeting a corresponding rule threshold, identifying a plurality of usable sources from the plurality of sources, the usable sources excluding the first source, identifying a downstream task to be executed, the downstream task being associated with an overall population, identifying a tagged population based on the plurality of outputs associated with the usable sources, the tagged population being a subset of the overall population, and activating the downstream execution for the tagged population.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 9 depicts an example of a computing device, according to one or more embodiments.

Like reference numbers and designations in the various drawings indicate like elements.

DETAILED DESCRIPTION OF EMBODIMENTS

Figure 1A:
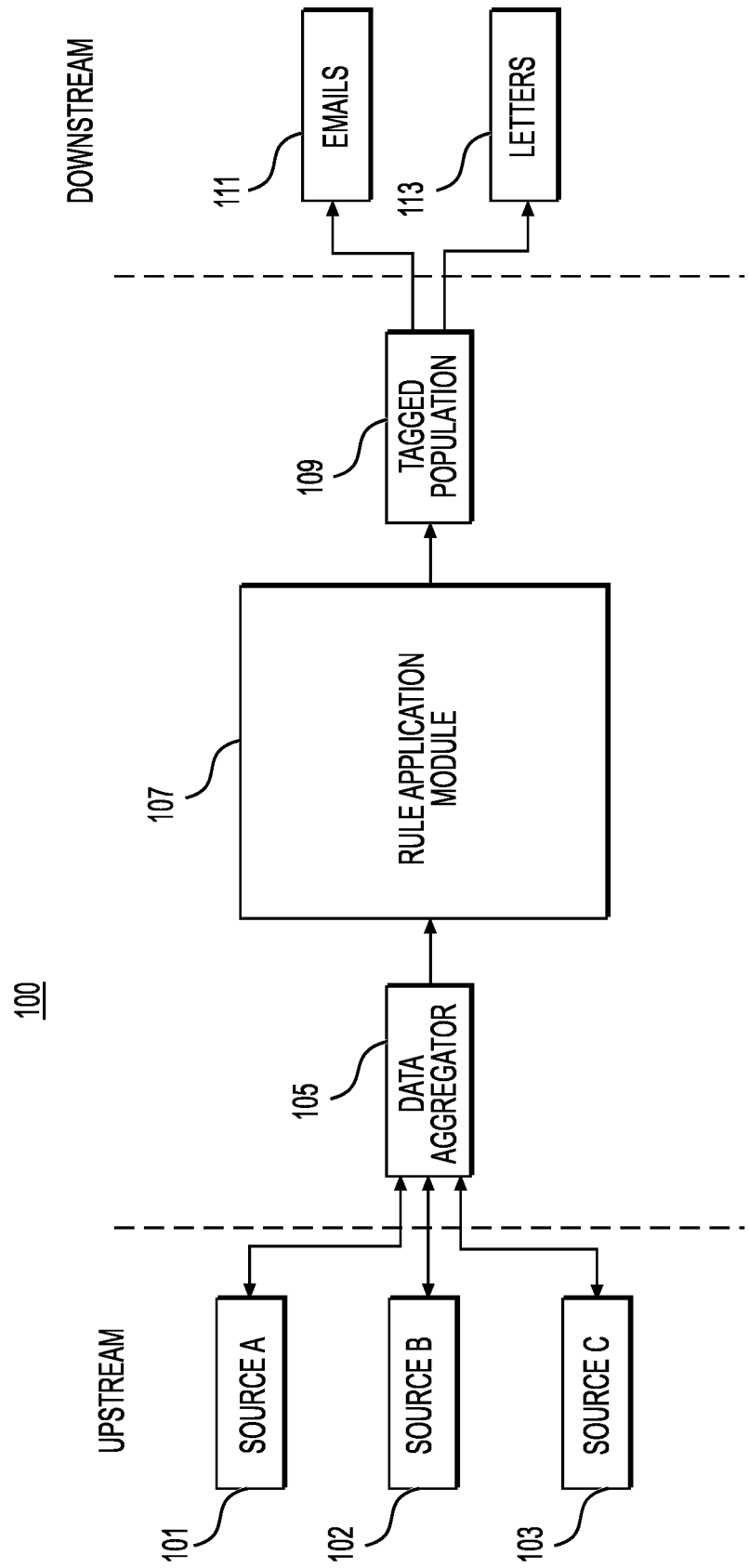
FIG. 1A depicts an exemplary decision implementation environment, according to one or more embodiments.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

As used herein, "upstream data" may be data received from one or a plurality of sources that generate, modify, or obtain data. An upstream data source may be a data source that collects or generates data based on user account information, user behavior information, user action information, user status, user changes, system status, system profiles, system actions, or the like. As an example, an upstream data source may include data about whether one or more users have activated a given user device having one or more device features (e.g., location services) that enable the respective user device to perform a task (e.g., identify their location). As another example, an upstream data source may include data about whether or not each of a plurality of users has activated a feature (e.g., enroll in email notifications) using each of their user profiles. Upstream data sources may provide data related to any number of users (e.g., millions of users). The upstream data may be organized based at least on a type of at least a subset of the upstream data. For example, organized upstream data may associate a plurality of data points with a corresponding user such that a plurality of different upstream data sources may have data about a given user and may identify that data as being associated with that given user (e.g., a first upstream data source may have device information about a first user and a second upstream data source may have enrollment data about the same first user).

Upstream data sources include, but are not limited to relational databases (e.g., Snowflake database, Postgres, etc.), non-relational databases (e.g., MongoDB, DynamoDB, etc.), or the like. A relational database may be a digital database based on the relational model of data. It may be maintained using a relational database management system (RDBMS). A relational database may use a Structured Query Language (SQL) language for querying and maintaining the database. A relational database may organize data into one or more tables (relations) of columns and rows, with a unique key identifying each row. Each table/relation may represent one entity type (e.g., a user, product, service, system, etc.). The rows of a relational database may represent instances of a given entity type and the columns may represent values attributed to that instance (e.g., user attribute, setting, product features, etc.). A non-relational database may be a database that does not use the tabular arrangement of relational databases, as described herein. A non-relational database may use a storage model that is optimized for the specific requirements of the type of data being stored. For example, data may be stored as simple key/value pairs, as JavaScript Object Notation (JSON) documents, or as a graph including edges and vertices. Upstream data sources may include files or file systems provided in any applicable format such as Parquet, ARVO, (JSON), comma-separated values (CSV), or the like.

As used herein, "downstream tasks" may be tasks performed using the upstream data for a tagged population output by one or more rules. The tasks may include any applicable use of the upstream data such as generating a graphical user interface (GUI), generating and/or sending communication (e.g., emails, letters, alerts, etc.), updating user settings, updating system settings, increasing use of a resources (e.g., bandwidth, credit, access), or the like. One or more downstream tasks may rely on the accuracy of the upstream data such that errors in the upstream data may result in faults in corresponding downstream tasks.

As used herein, "rules" may be inclusionary or exclusionary rules that include or exclude a portion of an overall population to determine a tagged population for a downstream task. The overall population may be identified based on upstream data sources, as disclosed herein. The tagged population may be a subset of the overall population that is eligible for the downstream task based on one or more rules.

According to an implementation of the disclosed subject matter, data may be gathered from a plurality of upstream data sources for processing. The gathered data may correspond to an overall population that the data is associated with. For example, the upstream data may include user device settings data from one upstream data source and program enrollment data from another upstream data source. The user device settings data may be for a first population and the enrollment data may be for a second population. The first population may have overlapping users with the second population. An overall population may include the first population and the second population. The gathered data may be provided to a rules application module that applies a plurality of rules, individually, to the gathered data such that each rule is applied to the gathered data individually and has an individual rule-based output. The individual outputs of each of the rules may designate a tagged population that is a subset of an overall population associated with the upstream data. For example, a first rule may exclude users that do not have a first user setting on a user device and a second rule may exclude users that are not enrolled in a first program. Accordingly, the tagged population may be the subset of the overall population that has the first setting on a user device and is enrolled in the first program.

Each rule may be evaluated individually such that an output is generated for each rule. The output may be analyzed to determine if one or more rule thresholds related to the output of each rule are met. If a determination is made that, for a given rule, a predetermined or dynamically determined rule threshold is not met, then the output for that rule maybe flagged for intervention. The intervention may include overriding an error or updating the threshold and may include updating the rule. By applying individual rules based on corresponding rule thresholds, data quality of the upstream data used for downstream execution may be improved.

According to an implementation, a plurality of rules may be applied to upstream data at the source of the respective upstream data before the upstream data from the plurality of upstream data sources is gathered. Accordingly, the same rule or set of rules may be applied to each of a plurality of upstream data sources. The rules applied to each of the upstream data sources may have rule thresholds that are adjusted for each respective source. For example, a first rule applied to a first upstream data source may have rule thresholds based on the population associated with that upstream data source (e.g., 2 million users) whereas the first rule applied to a second upstream data source may have rule thresholds based on the population associated with that upstream data source (e.g., 3 million users). The users between two different upstream data sources may be unique or may fully or partially overlap.

Applying rules to upstream data at the upstream data sources may allow identification of upstream data sources that do not meet quality requirements (e.g., rule thresholds). Upstream data from an upstream data source that does not meet quality requirements may not be used for downstream execution. According to an implementation, if an upstream data source does not meet quality requirements, a last known valid source version of the upstream data source may be used. For example, if an upstream data source provides user enrollment information in a program and does not meet rule thresholds for one or more rules, then data from a last known valid source version of that upstream data source that did meet corresponding rule thresholds may be used for downstream execution.

Techniques and systems disclosed herein may be implemented using a system including a computer server, database storage, electronic device or set of devices to generate upstream data, provide upstream data, gather upstream data from one or more upstream data sources, apply rules, identify a tagged population, and/or execute a downstream task. The techniques and systems allow use of quality data in identifying the tagged population such that the downstream execution is applied to the proper population and that users are not included when they should not be and users are not excluded when they should not be. Accordingly, the techniques and systems provided herein enable an improvement to the downstream execution technology by executing downstream tasks for the correct population and by more efficiently using system resources such that resources are not expended on the incorrect population. By providing individual rule-based monitoring and improvement, rules may be properly adjusted and invalid upstream data may be correctly flagged and corrected.

FIG. 1A depicts an exemplary computing environment 100 for downstream execution (e.g., a decision implementation environment). FIG. 1A includes upstream data source A 101, upstream data source B 102, and upstream data source C 103. While three data sources are depicted, it is understood that more or fewer data sources may be employed without departing from the scope of this disclosure. One or more of these upstream data sources may include a relational database, a non-relational database, or a file system. The upstream data sources may provide real-time data or may obtain, store, and/or generate data at periodic, programmed, or other times. The upstream data sources may provide, obtain, store and/or generate data based on user, system, network, or past information, changes, attributes, settings, or the like. Each upstream data source may provide data associated with a given population and the combined population associated with the data from each of the upstream data source A 101, upstream data source B 102, and upstream data source C 103 may be considered the overall population.

A data aggregator 105 may receive the upstream data from the upstream data source A 101, upstream data source B 102, and upstream data source C 103. The data aggregator 105 may aggregate the data from the plurality of upstream data sources and may organize the received data such that rules can be applied thereto. The data aggregator 105 may aggregate data that can be queried (e.g., data aggregator 105 may query data from upstream data sources). Data aggregator 105 may be a real-time analytics database designed for fast "slice-and-dice" analytics on large data sets. The data aggregator 105 may support use cases with real-time ingest, fast query performance, and/or high uptime. The data aggregator 105 may support aggregation of event-oriented data. The data aggregator 105 may use compressed bitmap indexes to create indexes that power fast filtering and real-time queries. The data aggregator 105 may first partition data by time and may also additionally partition data based on one or more other fields. Such multi-layered partitioning may lead to significant performance improvements for time-based queries. The data aggregator 105 may apply a columnar storage format by using column-oriented storage. The column-oriented storage may enable the data aggregator 105 to load the exact columns needed for a particular query. Additionally, each column using the column-oriented storage may be stored such that it is optimized for its particular data type, which further supports faster scans and aggregation. The data aggregator 105 may apply a scalable distributed system. The data aggregator 105 may apply massively parallel processing such that it processes a given query in parallel across the plurality of upstream data sources. The massively parallel processing may enable the data aggregator 105 to simultaneously fulfill a set of coordinated queries in parallel.

Although a single data aggregator 105 is shown in FIG. 1A, it will be understood that the data aggregator 105 may be applied via a plurality of servers and/or databases that may be located locally or remotely from each other.

A rule application module 107 may apply one or a plurality of rules to the aggregated data output by the data aggregator 105. The data provided by the data aggregator 105 may correspond to an overall population, as discussed herein. The rules application module 107 may apply a plurality of rules to the aggregated data and output a tagged population 109 that passed and/or was not excluded by each of the plurality of rules. The tagged population 109 may include tags, pointers, or other identifiers that include the population that passed and/or was not excluded by each of the rules.

Downstream execution of one or more activities such as transmission of emails 111, generation of letters 113, or the like may be implemented for the tagged population 109. The rules applied using rule application module 107 may be configured such that applicable downstream execution of the one or more activities occurs for an appropriate tagged population 109. However, as disclosed herein, the application of all rules or grouping a plurality of rules may exclude users from the tagged population 109 without considering the effect of each rule on the upstream data. Accordingly, low quality data and/or errors in one or more rules may go undetected.

Figure 1B:
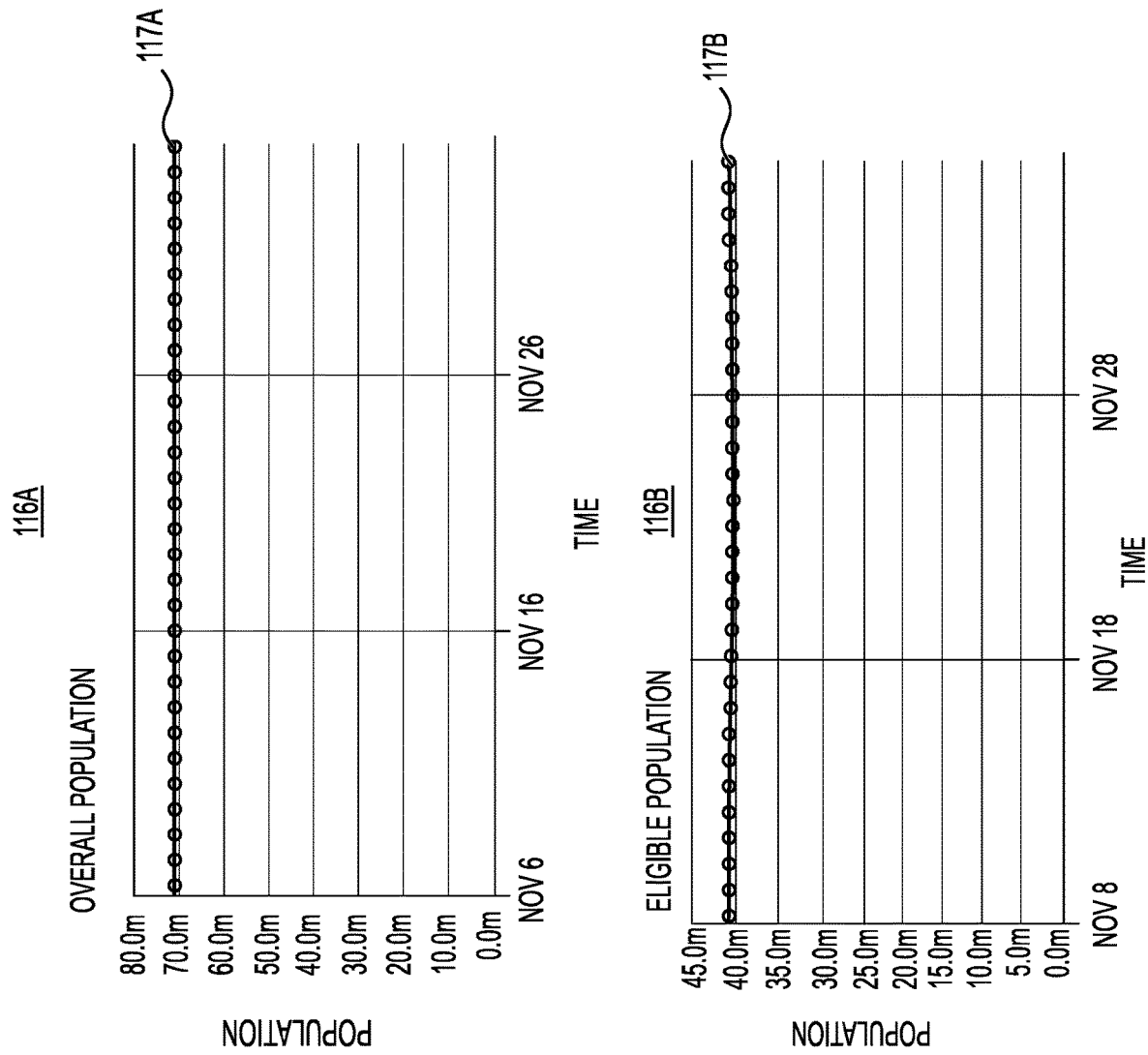
FIG. 1B depicts an example output population based on the exemplary decision implementation environment of FIG. 1A, according to one or more embodiments.

FIG. 1B shows an example chart 116A with a starting population 117A and a tagged population 117B over a period of time. As shown, the starting population may be approximately 70 million users which may be reduced to approximately 40 million users, as shown in 116B, based on the upstream data associated with the starting population being aggregated via data aggregator 105 and processed through rule application module 107. Without an individual application of the rules and without corresponding individual rule outputs by the rules application module 107, the reduction of the population by 30 million users may not be understood or verified for quality and/or accuracy.

Figure 2:
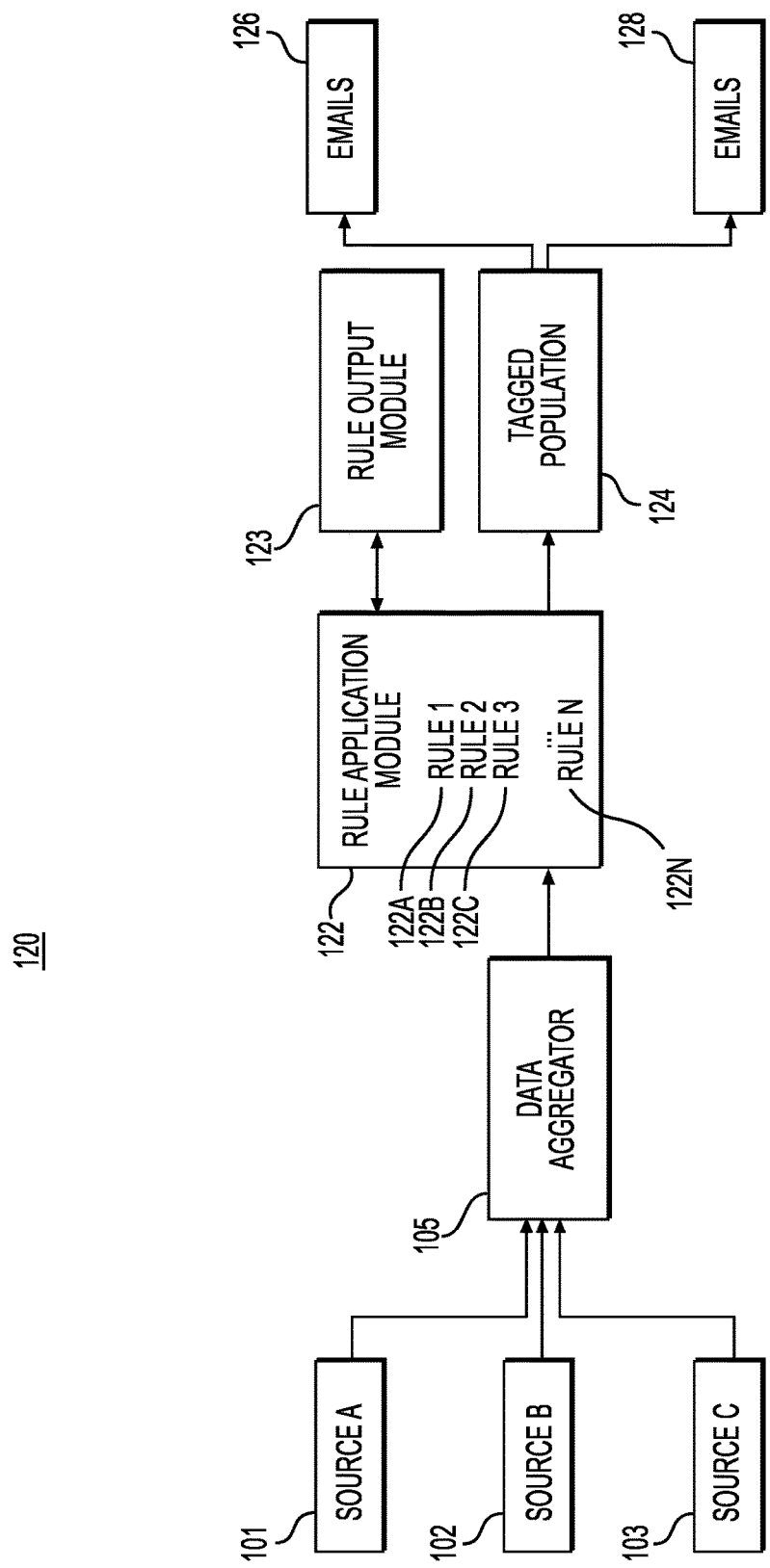
FIG. 2 depicts an exemplary rule-based decision implementation environment, according to one or more embodiments.

FIG. 2 depicts an exemplary computing environment 120 for downstream execution (e.g., for rule-based decision implementation). FIG. 2 includes the upstream data source A 101, upstream data source B 102, and upstream data source C 103 of the computing environment 100 of FIG. 1A. As noted above, while three data sources are depicted, it is understood that more or fewer data sources may be employed without departing from the scope of this disclosure. The data aggregator 105 of the computing environment 100 of FIG. 1A is also provided in computing environment 120. Data aggregator 105 may receive the upstream data from the upstream data source A 101, upstream data source B 102, and upstream data source C 103. The data aggregator 105 may aggregate the data from the plurality of upstream data sources and may organize the received data such that rules can be applied thereto. Although a single data aggregator 105 is shown in FIG. 2, it will be understood that the data aggregator 105 may be applied via a plurality of servers and/or databases that may be located locally or remotely from each other.

The computing environment 120 of FIG. 2 includes a rule application module 122 configured to apply a plurality of rules, individually, such that each applied rule has a corresponding output associated with the rule. As shown, the rule application module may apply rule 1 122A, rule 2 122B, rule 3 122C . . . and rule N 122N, to data aggregated by the data aggregator 105. The data provided by the data aggregator 105 may correspond to an overall population, as discussed herein. The rules application module 122 may individually apply a plurality of rules to the aggregated data, corresponding to the overall population, such that a plurality of outputs are generated including at least one output for each of the plurality of rules applied to the upstream data corresponding to the overall population. Each of the plurality of outputs may be associated with a corresponding rule of the plurality of rules. The rules application module 122 may function differently than the rules application module 107 such that rules application module 107 provides a single output (e.g., the tagged population 109) whereas the rules application module 122 outputs a result from each of the rules (e.g., rule 1 122A, rule 2 122B, rule 3 122C . . . rule N 122N). A tagged population 124 may be based on the result of each of the rules output by the rules application module 122. The rules application module 122 may also output the result of each individual rule via a rules output module 123. The rules output module may provide the results of each of the rules via a GUI or any other applicable medium. As further disclosed herein, a machine learning platform, automated platform, and/or user may interact with the rules output module 123 to adjust rule thresholds associated with a rule, modify a rule, override a rule, or the like. A single rule may have multiple rule thresholds (e.g., an upper threshold, a lower threshold, etc.) and each of the multiple rule thresholds may be modified independently of each other.

The tagged population 124 may include tags, pointers, or other identifiers that include the population that passed (e.g., was not excluded when being processed/analyzed via) each of the rules. Downstream execution of one or more activities such as transmission of emails 126, generation of letters 128, or the like may be implemented for the tagged population 124 which may be updated or modified based on the rules output module 123. The rules applied using rule application module 122 may be configured such that applicable downstream execution of the one or more activities occurs for an appropriate tagged population 124.

Figure 3:
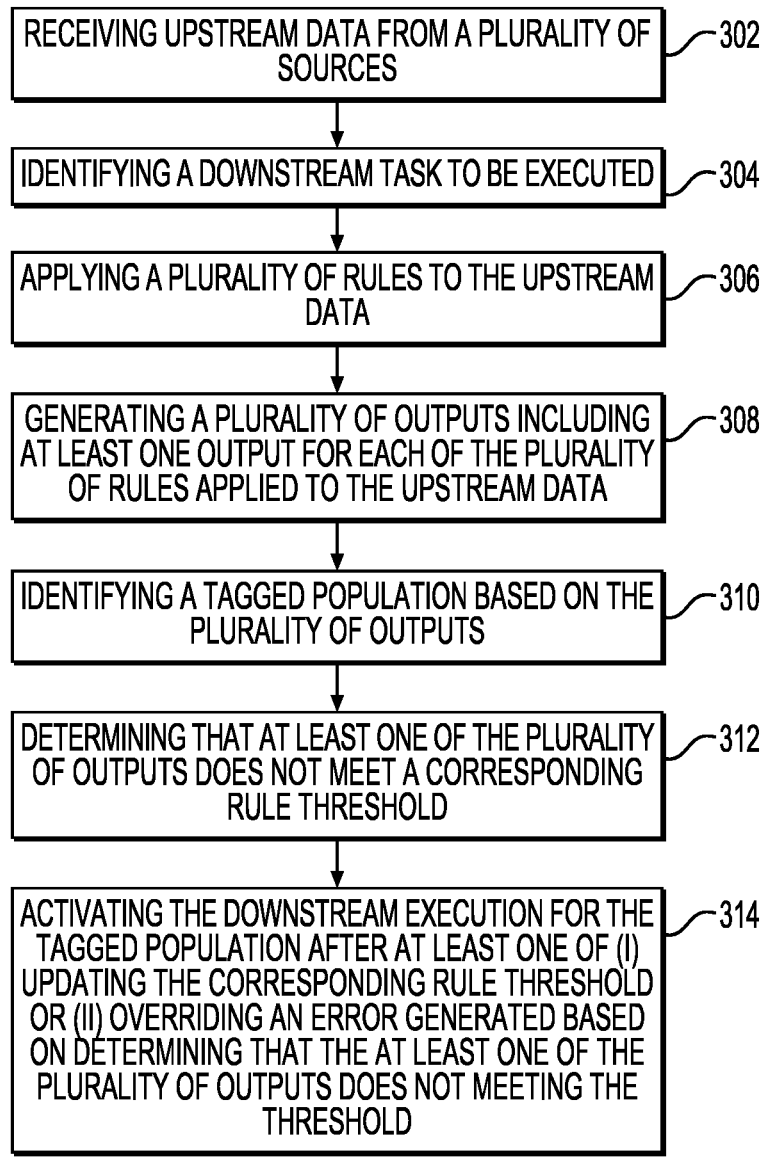
FIG. 3 depicts a flowchart of an exemplary method for activating downstream execution, according to one or more embodiments.

FIG. 3 is a flowchart 300 for activating downstream execution of a task for a tagged population. At 302, upstream data from one or a plurality of sources may be received. The upstream data may be received from an upstream data source (e.g., upstream data source A 101, upstream data source B 102, and upstream data source C 103 of the computing environment 100 of FIG. 1A and computing environment 120 of FIG. 2.) The upstream data sources may be in communication with a data aggregator (e.g., data aggregator 105) through a wired connection, wireless connection, or the like and may be connected to the data aggregator over an electronic network 925, as shown in FIG. 9 herein. The upstream data sources may store, generate, determine, and/or provide the upstream data based on user status, user profiles, user action, system status, system profiles, system actions, or the like.

At 304, a downstream task to be executed based on the upstream data may be identified. The downstream task may include any applicable use of the upstream data such as generating a GUI, generating and/or sending communication (e.g., emails, letters, alerts, etc.), updating user settings, updating system settings, increasing use of a resources (e.g., bandwidth, credit, access), or the like. The downstream task may rely on the accuracy of the upstream data such that errors in the upstream data may result in faults in corresponding downstream tasks. Accordingly, based on the downstream task, a plurality of rules may be identified and applied, at 306, to the upstream data to identify a tagged population.

The plurality of rules may be selected from a pool of available rules such that the plurality of rules applied at 306 are a subset of the pool of available rules. The subset of rules from the pool of available rules may be selected based on the given downstream task such that the selected plurality of rules identify a tagged population based on the downstream task. For example, the downstream task may be to send a reminder of an upcoming incentive for a given program. Accordingly, a first rule for this downstream task may be to exclude users that are not part of the given program. A second rule for this downstream task may be to exclude users that have already taken advantage of the upcoming incentive. Alternatively, the plurality of rules may be generated (e.g., using a machine learning algorithm) based on the downstream task. The rules may be generated based on one or more parameters associated with the downstream task. For example, a machine learning training module may receive a plurality of historical downstream tasks and rules associated with those historical downstream tasks. The machine learning training module may generate a machine learning model that receives, as input, a new downstream task and may generate a plurality of rules that identify a tagged population based on the new downstream task, based on weights, layers, and/or other components of the machine learning model trained using the historical downstream task and corresponding rules.

Each rule from the plurality of rules applied at 306 may be inclusive or exclusive. An inclusive rule may include a portion of the overall population whereas an exclusive rule may exclude a portion of the overall population. The plurality of rules applied at 306 may include a combination of inclusive rules and exclusive rules. As an example, an inclusive rule may qualify a first subset of an overall population to be designated as a tagged population. However, the inclusive rule may not prevent a portion of the population not included in the first subset from being designated as a tagged population based on a different rule. An example exclusive rule may exclude a second subset of an overall population such that the second subset of the overall population may not be designated as part of a tagged population based on the exclusion.

Figure 6A:
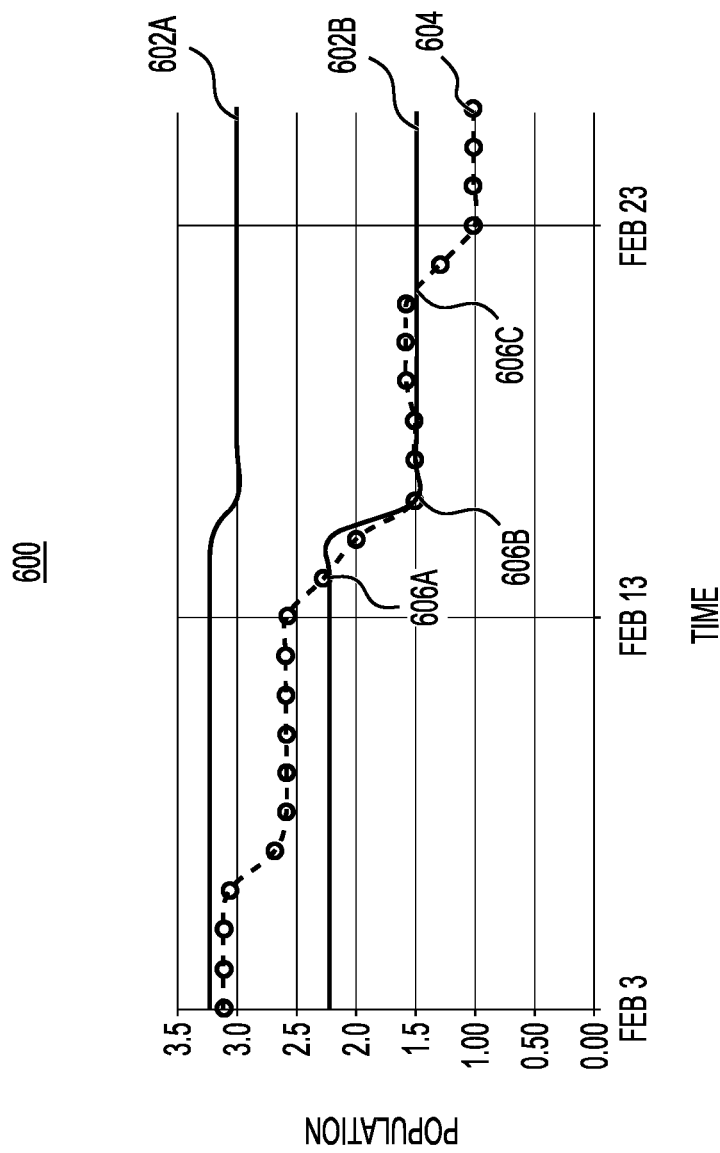
FIG. 6A depicts a graphical user interface (GUI) of a source-tagged population based on a rule, according to an example of the present disclosure.

At 308, a plurality of outputs including at least one output for each of the plurality of rules applied to the gathered upstream data may be generated. Each of the plurality of outputs may be associated with a corresponding rule of the plurality of rules applied at 306. The plurality of outputs may be provided in any applicable format such as a GUI, a report, one or more messages, one or more alerts, or the like. For example, a plurality of GUIs may be generated, each based on the plurality of outputs such that a different GUI is provided for each of the plurality of outputs. One or more of the GUIs may provide a graphical representation of a tagged population that is output (e.g., included, excluded, etc.) by one or more respective rules. FIG. 6A, as further discussed herein, shows an example GUI output based on a given rule and shows the source-tagged population 604 over a period of time that the corresponding rule is applied.

The plurality of outputs including at least one output for each of the plurality of rules applied to the gathered upstream data may be generated simultaneously or as each respective rule is applied to the gathered upstream data. The plurality of outputs may each be provided via an interface (e.g., a GUI) or only specific outputs may be provided based on, for example, rule thresholds, as further discussed herein.

At 310, a tagged population may be identified based on the plurality of outputs. The tagged population may be a subset of the overall population such that a portion of the overall population may be excluded from being a part of the tagged population. The users included in the tagged population may be the users that are not excluded by one or more of the plurality of rules applied at 306 and/or may be users that are included by one or more of the plurality of rules applied at 306. The tagged population may be provided to a system component (e.g., a downstream task implementation component) or may be stored for access by a system component. As applied herein, a downstream task implementation component may be any component that facilitates the implementation of a downstream task. Example of a downstream task implementation component include email distribution services, letter generation tools, setting modifiers, or the like or a combination thereof.

At 312, a determination may be made that at least one of the plurality of outputs of 308 does not meet a corresponding rule threshold. A rule threshold may be a bound, value, or number that triggers the determination that an output does not meet the rule threshold. The rule threshold may be a bound, value, or number of a population that is included and/or excluded based on the corresponding rule. For example, a given rule may be to exclude individuals that are not enrolled in a program. The historical number of users this rule excludes may be 2 million users. Accordingly, an upper rule threshold may be 3 million users and a lower rule threshold may be 1 million users such that when the rule is applied at 306 to generate an output at 308, if that output excludes more than 3 million users or less than 1 million user, a determination may be made at 312 that the output does not meet the rule thresholds.

FIG. 6A shows a chart 600 with an example upper rule threshold 602A and a lower rule threshold 602B. As shown, a rule-based source-tagged population 604 may cross the lower rule threshold 602B at time 606A, 606B, and 606C.

A rule threshold may be pre-determined and/or dynamically determined. A pre-determined rule threshold may be provided via a user input, historical rule threshold, or the like. A dynamically determined rule threshold may be determined using a machine learning model. The machine learning model may be trained as disclosed herein in reference to FIG. 8. The machine learning model may be trained using historical rule thresholds, one or more tagged populations, a system setting, a user setting, or the like. The machine learning model may receive, as inputs, one or more overall populations, a system setting, a user setting, or the like and may output one or more rule thresholds based on the same. For example, a machine learning model may receive, as input, a current trend of users enrolling in a given program, an overall population, and one or more previous number of users excluded based on application of the corresponding rule. The machine learning model may output an upper rule threshold (e.g., 602A) and a lower rule threshold (e.g., 602A) based on the inputs.

At 314, downstream execution may be activated for the tagged population after updating the corresponding rule threshold for the output that does not meet the rule threshold at 312 and/or overriding an error generated based on determining that the output does not meet the rule threshold at 312. By either updating the rule threshold or overriding an error, discrepancies associated with the upstream data and/or one or more rules may be addressed and captured prior to the execution of the downstream task. Additionally, updating the rule threshold or overriding an error may provide insight into one or more factors associated with the corresponding rules such that the system, one or more rules, or associated tasks may be updated. As an example, a rule threshold for a given rule excluding users that are not enrolled in a program may not be met. As a result, an alert may be generated to indicate that the rule threshold has not been met. As a result, an error in the enrollment system for enrolling users into the program may be identified and corrected such that users that may not have been able to enroll in the program may then be able to enroll in the program as a result of the alert. The rule threshold may then be updated and/or the alert may be overridden to execute the downstream task.

According to an implementation, upstream data identified with the rule corresponding to the output that does not meet a corresponding rule threshold may be evaluated for errors. As a result of the evaluation, the upstream data source associated with the upstream data may be updated, removed, or otherwise modified. Such review of the upstream data may ensure that optimal data is utilized for a downstream task and also enables detection of errors associated with the upstream data.

Figure 4:
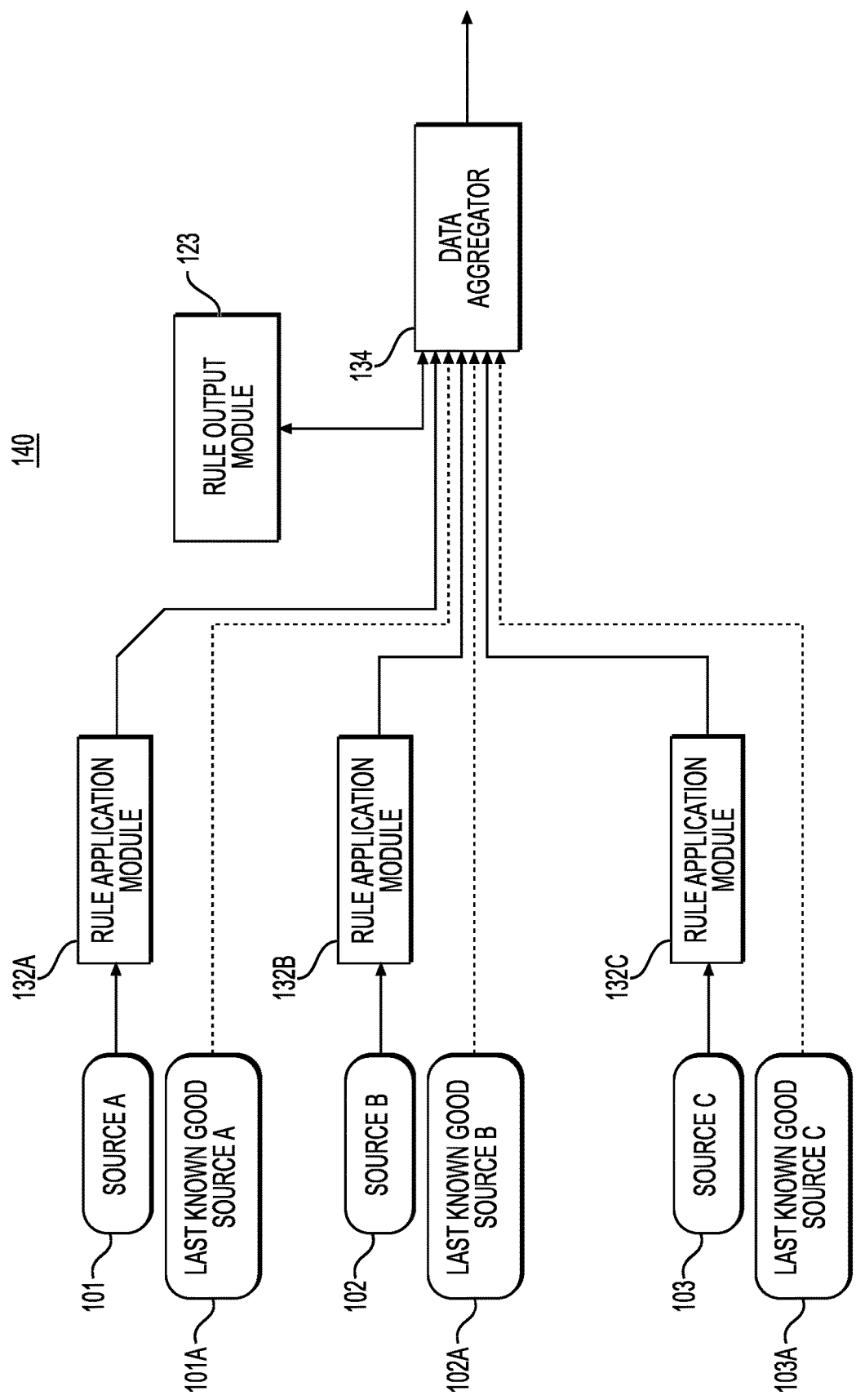
FIG. 4 depicts an exemplary source specific rule-based decision implementation environment, according to one or more embodiments.

FIG. 4 depicts an exemplary computing environment 140 for downstream execution (e.g., for source specific rule-based decision implementation). The computing environment 140 of FIG. 4 applies a plurality of rules at each respective upstream data source whereas the computing environment 120 of FIG. 2 applies the plurality of rules after the data from multiple upstream data sources is aggregated. As discussed herein, by applying a plurality of rules at each upstream data source, the plurality of corresponding outputs may be used to determine whether the respective upstream data sources have data of sufficient quality before the data is used for downstream task execution.

FIG. 4 includes the upstream data source A 101, upstream data source B 102, and upstream data source C 103 of the computing environments 100 of FIG. 1A and 120 of FIG. 2. While three data sources are depicted, it is understood that more or fewer data sources may be employed without departing from the scope of this disclosure. Data aggregator 134 is provided in the computing environment 140 and may be similar to the data aggregator 105 of the computing environments 100 of FIG. 1A and 120 of FIG. 2. However, in contrast to data aggregator 105, data aggregator 134 may be configured to also receive individual rule-specific tagged populations and/or outputs of one or more individual rules instead of or in addition to upstream data from the upstream data sources. Data aggregator 134 may receive individual rule-specific tagged populations and/or outputs of one or more individual rules via a wired connection, wireless connection, or any other applicable connection. The data aggregator 134 may aggregate the individual rule-specific tagged populations and/or outputs of one or more individual rules generated from the plurality of upstream data sources and may organize the received individual rule-specific tagged populations and/or outputs of one or more individual rules for downstream task execution. Although a single data aggregator 134 is shown in FIG. 4, it will be understood that the data aggregator 134 may be applied via a plurality of servers and/or databases that may be located locally or remotely from each other.

The computing environment 140 of FIG. 4 includes a rule application module 132A, rule application module 132B, and rule application module 132C in connection with upstream data source A 101, upstream data source B 102, and upstream data source C 103, respectively. Each of the rule application modules may be configured to apply a plurality of rules, individually, to upstream data associated with each of the upstream data sources such that each applied rule has a corresponding output associated with the rule. Each of the rule application module 132A, rule application module 132B, and rule application module 132C may be the same as or similar to rule application module 122 of computing environment of FIG. 2 and may apply a plurality of rules to received upstream data. According to an implementation, the number of rule application modules may be equal to the number of upstream sources. According to another implementation, some upstream sources may have corresponding rule application modules and one or other upstream sources may provide data to a data aggregator, and then a rule application module may be applied to the resulting aggregated data. The data provided by the combination of each of the upstream data source A 101, upstream data source B 102, and upstream data source C 103 may correspond to an overall population.

Each rule application module (rule application module 132A, rule application module 132B, and rule application module 132C) may individually apply a plurality of rules to the upstream data from the respective upstream data source (upstream data source A 101, upstream data source B 102, and upstream data source C 103) such that a plurality of outputs generated include at least one output for each of the plurality of rules applied to the upstream data. Each of the plurality of outputs may be associated with a corresponding rule of the plurality of rules applied at a respective upstream data source. Each rule applications module (rule application module 132A, rule application module 132B, and rule application module 132C) may function differently than the rules application module 107 of computing environment 100 of FIG. 1A, such that rules application module 107 provides a single output (e.g., the tagged population 109) whereas the rules application modules of computing environment 140 may output a result from each of the rules, for each of the upstream data sources. A tagged population may be based on the result of each of the rules output by the rules application modules (rule application module 132A, rule application module 132B, and rule application module 132C) of computing environment 140. The rules application modules of computing environment 140 may also output the result of each individual rule via a rules output module 123. The rules output module may provide the results of each of the rules for each of the upstream data sources via a GUI or any other applicable medium. As disclosed herein, a machine learning platform, automated platform, and/or user may interact with the rules output module 123 to adjust rule thresholds associated with a rule, modify a rule, override a rule, or the like.

FIG. 4 includes last known valid source A 101A, last known valid source B 102A, or last known valid source C 103A of FIG. 4 which are each replacement sources for upstream data source A 101, upstream data source B 102, upstream data source C 103, respectively. The last known valid sources may be respective versions of the data sources such that the last known valid sources previously passed one or more rules without breaching respective rule thresholds. The last known valid sources may correspond to older data but may provide a confidence level for validity of the data, based on passing the one or more rules.

Figure 5:
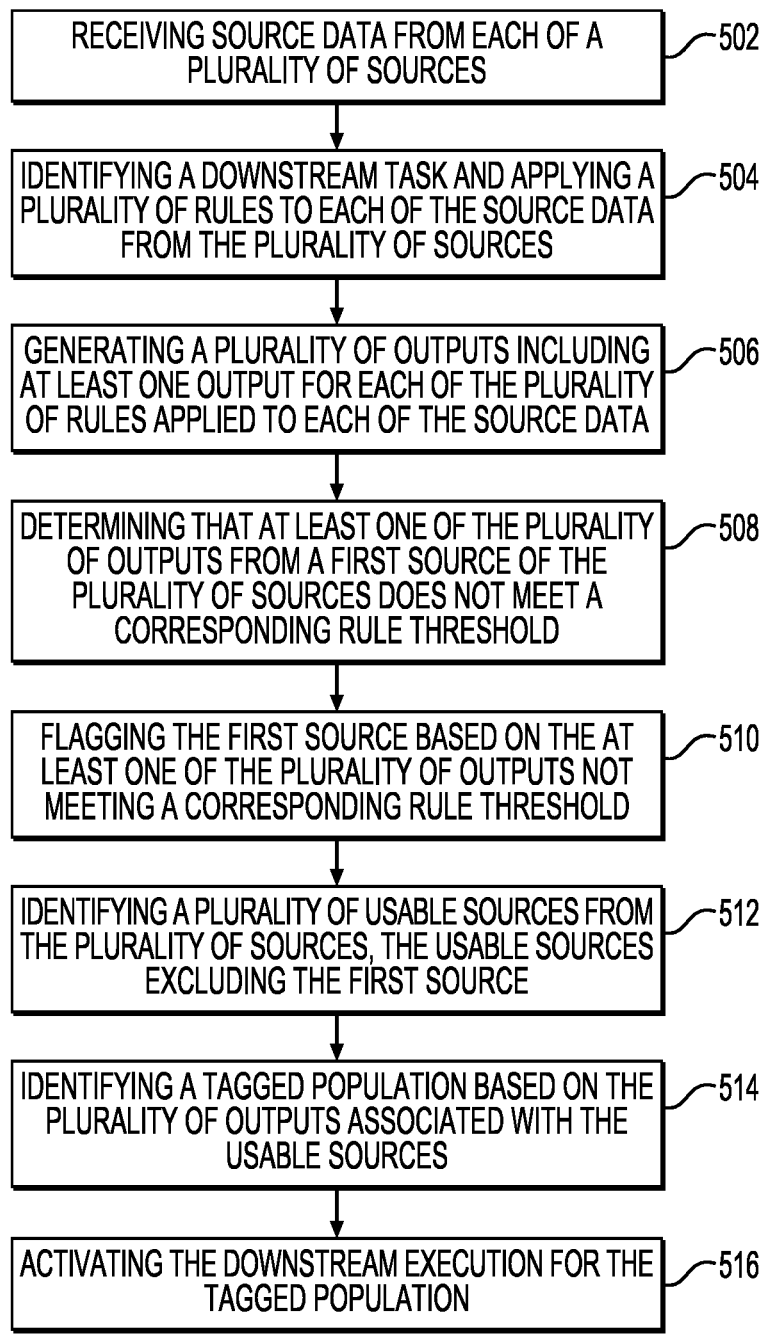
FIG. 5 depicts a flowchart for a source specific rule-based decision implementation, according to one or more embodiments.

FIG. 5 is a flowchart 500 for activating downstream execution for a tagged population based on a plurality of rules applied at each upstream data source. At 502, upstream data from one or a plurality of sources may be received. The upstream data may be received from an upstream data source (e.g., upstream data source A 101, upstream data source B 102, and upstream data source C 103 of the computing environment 140 of FIG. 4.) Each of the upstream data sources may be in communication with a respective rule application module (e.g., rule application module 132A, rule application module 132B, and rule application module 132C of FIG. 4). The upstream data sources may provide data to respective rule application modules based on a query from the respective rule application modules, at pre-determined time periods, or when data is available (e.g., in real-time).

At 504, a downstream task to be executed may be identified. The downstream task may include any applicable use of the upstream data such as generating a GUI, generating and/or sending communication (e.g., emails, letters, alerts, etc.), updating user settings, updating system settings, increasing use of a resources (e.g., bandwidth, credit, access), or the like. The downstream task may rely on the accuracy of the upstream data such that errors in the upstream data may result in faults in corresponding downstream tasks. Accordingly, based on the downstream task, a plurality of rules may be identified and applied, at 504, to the upstream data to identify a tagged population. Each or a subset of the plurality of rules may be applied at each upstream data source.

The plurality of rules may be selected from a pool of available rules such that the plurality of rules applied at 504 are a subset of the pool of available rules. The subset of rules from the pool of available rules may be selected based on the given downstream task such that the selected plurality of rules identify a tagged population based on the downstream task. Alternatively, the plurality of rules may be generated (e.g., using a machine learning algorithm, via a user, etc.) based on the downstream task. The rules may be generated based on one or more parameters associated with the downstream task. Each rule from the plurality of rules applied at 504 may be inclusive or exclusive. An inclusive rule may include a portion of the overall population whereas an exclusive rule may exclude a portion of the overall population. The plurality of rules applied at 504 may include a combination of inclusive rules and exclusive rules.

At 506, a plurality of outputs including at least one output for each of the plurality of rules applied to data from each of the respective upstream data sources may be generated. Each of the plurality of outputs may be associated with a corresponding rule of the plurality of rules applied at 504 to each respect upstream data source. The plurality of outputs may be provided in any applicable format such as a GUI, a report, one or more messages, one or more alerts, or the like. The plurality of outputs including at least one output for each of the plurality of rules applied to each given upstream data source may be generated simultaneously or as each respective rule is applied to the available upstream data. The plurality of outputs may each be provided via an interface (e.g., a GUI) or only specific outputs may be provided based on, for example, rule thresholds, as discussed herein.

At 508, a determination may be made that at least one of the plurality of outputs of 506 for a given upstream data source does not meet a corresponding rule threshold. A rule threshold may be a bound, value, or number that triggers the determination that an output does not meet the rule threshold. The rule threshold may be a bound, value, or number of a population that is included and/or excluded based on the corresponding rule.

At 510, a first upstream data source may be flagged based on at least one of the plurality of outputs not meeting a corresponding rule threshold. The upstream data source may be marked for review, may be disqualified, or may be reconfigured based on being flagged. The flagging may indicate an error in the data provided by the corresponding upstream data source or a system or component associated with the corresponding upstream data source.

According to an implementation, the corresponding rule threshold for the output that does not meet the rule threshold at 510 may be updated in a manner similar to that discussed herein at step 314 of FIG. 3. Alternatively, or additionally, the flagging based on determining that an output does not meet the rule threshold at 510 may be overridden in a manner similar to that discussed herein at step 314 of FIG. 3. By either updating the rule threshold or overriding a flag, discrepancies associated with the upstream data and/or one or more rules may be addressed and captured prior to the execution of the downstream task. Additionally, updating the rule threshold or overriding an error may provide insight into one or more factors associated with the corresponding rules such that the system, one or more rules, or associated tasks may be updated.

According to an implementation, upstream data identified with the rule corresponding to the output that does not meet a corresponding rule threshold may be evaluated for errors. As a result of the evaluation, the upstream data source associated with the upstream data may be updated, removed, or otherwise modified. Such review of the upstream data may ensure that optimal data is utilized for a downstream task and also enables detection of errors associated with the upstream data.

At 512, a plurality of usable sources from the plurality of upstream data sources may be identified. The first upstream data source flagged at 510 may be excluded from the plurality of usable sources. According to an implementation, the plurality of usable sources may include a replacement upstream data source that replaces the upstream data source flagged at 510. The replacement upstream data source may be a last known valid source such as last known valid source A 101A, last known valid source B 102A, or last known valid source C 103A of FIG. 4 which are each replacement sources for upstream data source A 101, upstream data source B 102, upstream data source C 103, respectively. For example, if an upstream data source provides user enrollment information in a program and does not meet rule thresholds for one or more rules, then data from a last known valid source version of that upstream data source that did meet corresponding rule thresholds may be used for downstream execution. The last known valid source may be a version of the upstream data source that is cached and may be marked as a last known valid source until a subsequent version of the upstream data source is identified as a good source (e.g., if the upstream data source meets the rule thresholds of the applicable rules.) A last known valid source may be a version of the upstream data that is specific to a given downstream task and/or rules corresponding to a given downstream task. Accordingly, a first last known valid source may be used for a first downstream task and a different second last known valid source may be used for a different second downstream task. Similarly, a first last known valid source may be used for a first set of rules (e.g., at a rule application module) and a different second last known valid source may be used for a different set of rules.

The output provided by the plurality of usable sources may include data from the upstream data sources that were not flagged at 510 and may also include data from one or more last known valid that are versions of the upstream data sources that were flagged at 510. Each usable source output provided based on the individual rules applied to each of the plurality of usable sources may identify a source-tagged population. Each source-tagged population may be the population output after the plurality of rules are applied to a given usable source.

The source-tagged population from each rule application module (e.g., rule application module 132A, rule application module 132B, and rule application module 132C of FIG. 4) may be aggregated at a data aggregator (e.g., data aggregator 134 of FIG. 4) to identify a tagged population at 514. The tagged population identified at 514 may be the combination of all the source-tagged populations output by each rule application module. The tagged population may be a subset of the overall population associated with each upstream data source such that a portion of the overall population may be excluded from being a part of the tagged population. The users included in the tagged population may be the users that are not excluded by one or more of the plurality of rules applied to respective upstream data sources at 504 and/or may be users that are included by one or more of the plurality of rules applied at 504. The tagged population may be provided to a system component (e.g., a downstream task implementation component) or may be stored for access by a system component. As applied herein, a downstream task implementation component may be any component that facilitates the implementation of a downstream task.

Example of a downstream task implementation component include email distribution services, letter generation tools, setting modifiers, or the like or a combination thereof. A 516, the downstream execution of the tagged population may be activated based on identifying the tagged population at 514.

Figure 7:
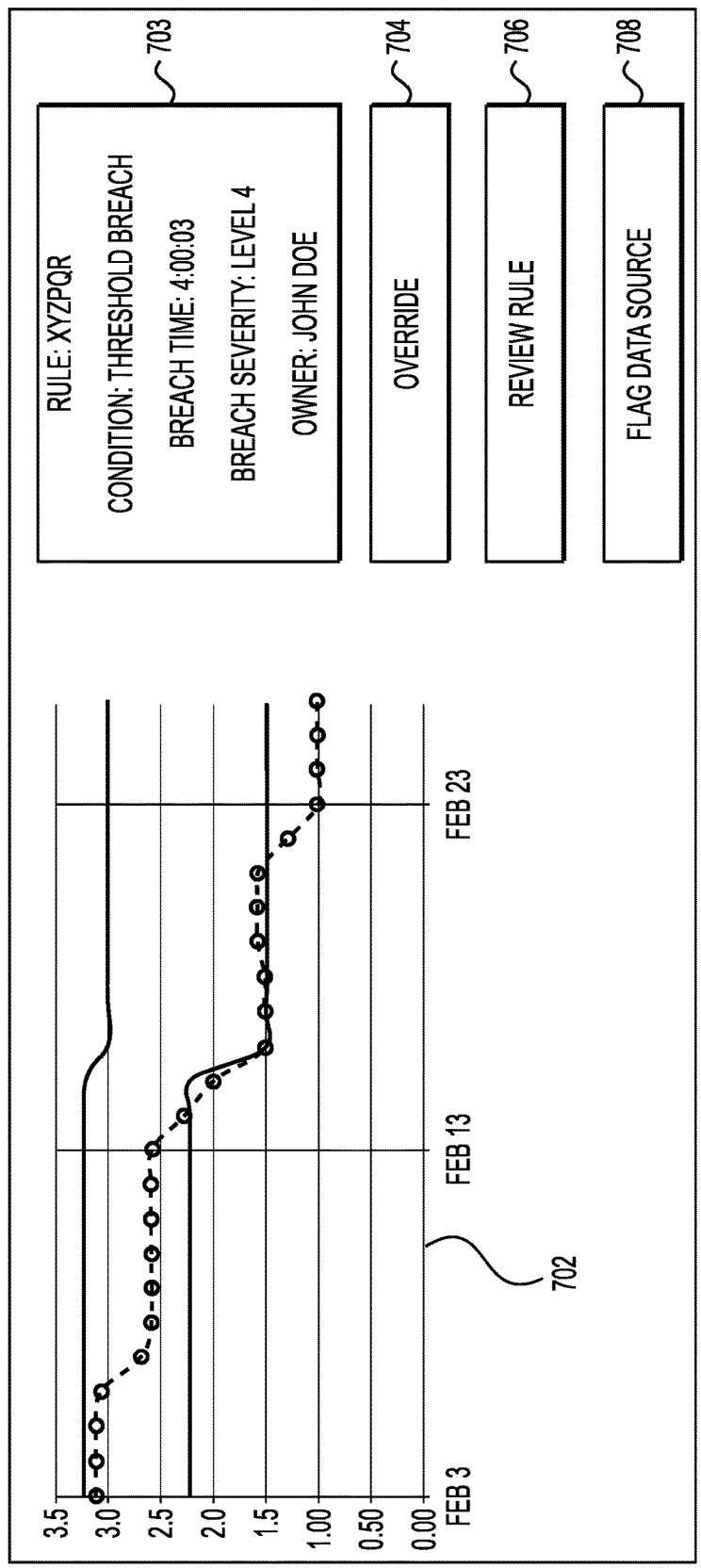
FIG. 7 depicts an example override dashboard, according to an example of the present disclosure.

FIG. 6A depicts a source-tagged population 604 based on a given rule. FIG. 6A includes an upper rule threshold 602A and a lower rule threshold 602B associated with a given rule. As shown, a rule-based, source-tagged population 604 may cross the lower rule threshold 602B at time 606A, 606B, and 606C after application of the given rule at those times. At each of these times 606A, 606B, and 606C, in accordance with the implementation shown in FIG. 2, a determination may be made that the output of the rule corresponding to FIG. 6A has an output that does not meet the corresponding threshold 602B. Accordingly, the rule threshold may be updated and/or an error generated based on determining that the output did not meet a threshold may be generated and overridden. The error may be overridden via any applicable manner including an input received via a GUI provided to a rule owner. A rule owner may be an individual, account, system, application, algorithm, or model assigned to a given rule. As an example, a GUI 700 of an override dashboard of FIG. 7 may be provided to a rule owner associated with the rule corresponding to FIG. 6A. As shown in FIG. 7, the rule owner may receive a graphical representation 702 of the source-tagged population 604. The graphical representation 702 may include historical changes in the source-tagged population 604 that provide context about the source-tagged population 604. The GUI 700 may also include one or more of a rule information area 703 that provides the rule designation (e.g., rule name, rule number, etc.), a current or past condition (e.g., a threshold breach, type of threshold breach, etc.), condition timing (e.g., breach time), breach severity (e.g., a level or extent of the breach), owner(s), or the like. An override option 704 may also be provided that enables an owner to override a breach. A rule review option 706 may also be provided and may enable an owner to review, modify, and/or cancel the rule.

At each of the times 606A, 606B, and 606C, in the implementations shown based on FIGS. 4 and 5, a determination may be made that the output of the rule corresponding to FIG. 6A has an output that does not meet the corresponding threshold 602B and a source that the data applied to the rule originated from may be flagged (e.g., at 510 of FIG. 5). The GUI 700 of FIG. 7 may be provided to a rule owner and the GUI 700 may include a flag data source option 708 that provides the owner with information about a corresponding upstream data source such that the upstream data source may be excluded from a usable sources group, as discussed herein.

Figure 6B:
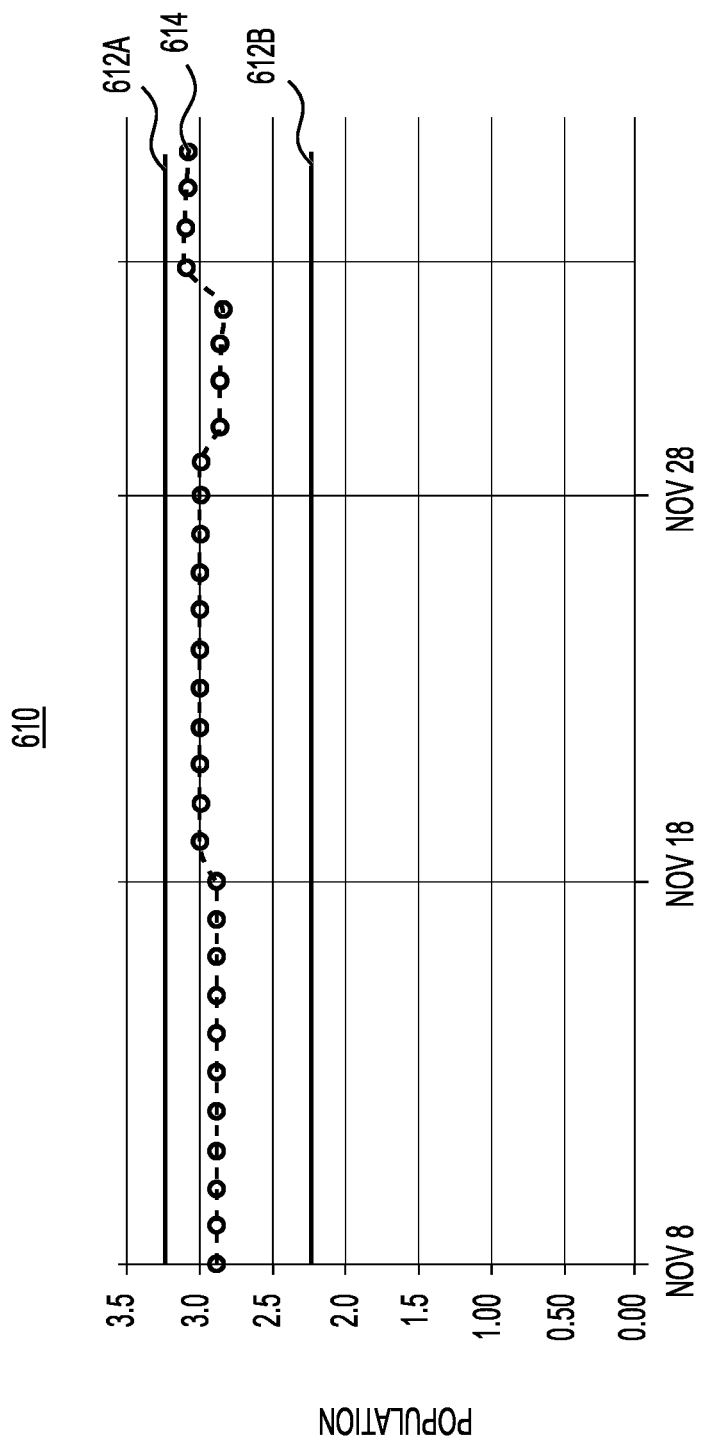
FIG. 6B depicts another source-tagged population based on a rule, according to an example of the present disclosure.

FIG. 6B depicts a chart 610 with another source-tagged population 614 based on a rule. As shown, an upper rule threshold 612A and a lower rule threshold 612B may be provided. The output of application of the rule of FIG. 6B may be the source-tagged population 614 that does not cross either the upper threshold 612A or lower threshold 612B. Accordingly, a corresponding downstream execution may be activated without having to update or override the rule and/or disqualify the corresponding upstream data source.

The systems and devices of the computing environments 100, 120, and/or 140 corresponding to FIGS. 1A, 2, and 4, respectively, may communicate in any arrangement. Systems and/or devices of the computing environments 100, 120, and/or 140 may communicate in order to activate downstream tasks.

Any of the components of computing environments 100, 120, and/or 140 may include a computer system such as, for example, a desktop computer, a mobile device, a tablet, a laptop, a haptic device, an oratory device, a wearable device such as a smart watch, smart glasses, servers, databases, cloud components or the like and may use one or more electronic application(s) (e.g., a program, plugin, etc.), installed on a memory of any of the components. In some embodiments, the electronic application(s) may be associated with one or more of the other components in the computing environments 100, 120, and/or 140. For example, the electronic application(s) may include a portal for accessing and/or interacting with one or more of the other components in the computing environments 100, 120, and/or 140.

In various embodiments, an electronic network may connect components of the computing environments 100, 120, and/or 140. The electronic network may be a wide area network ("WAN"), a local area network ("LAN"), personal area network ("PAN"), or the like. In some embodiments, the electronic network may include the Internet, and information and data provided between various systems occurs online. "Online" may mean connecting to or accessing source data or information from a location remote from other devices or networks coupled to the internet. Alternatively, "online" may refer to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). In some embodiments, the electronic network may include or may be in communication with a telecommunications network, e.g., a cellular network.

Although the components shown in FIGS. 1A, 2, and 4 are depicted as separate components, it should be understood that a component or portion of a component may, in some embodiments, be integrated with or incorporated into one or more other components. For example, a rules application module 122 may be part of the same component as a rule output module 123. Further, it should be understood that data described as stored on a memory of a particular system or device in some embodiments, may be stored in another memory or distributed over a plurality of memories of one or more systems and/or devices in other embodiments.

In the implementations described herein, various acts are described as performed or executed by components from computing environments 100, 120, and 140 of FIGS. 1A, 2, and 4, respectively. However, it should be understood that in various implementations, various components of the computing environments 100, 120, and 140 discussed above may execute instructions or perform acts including the acts discussed herein. Further, it should be understood that in various implementations, one or more steps may be added, omitted, and/or rearranged in any suitable manner.

Figure 8:
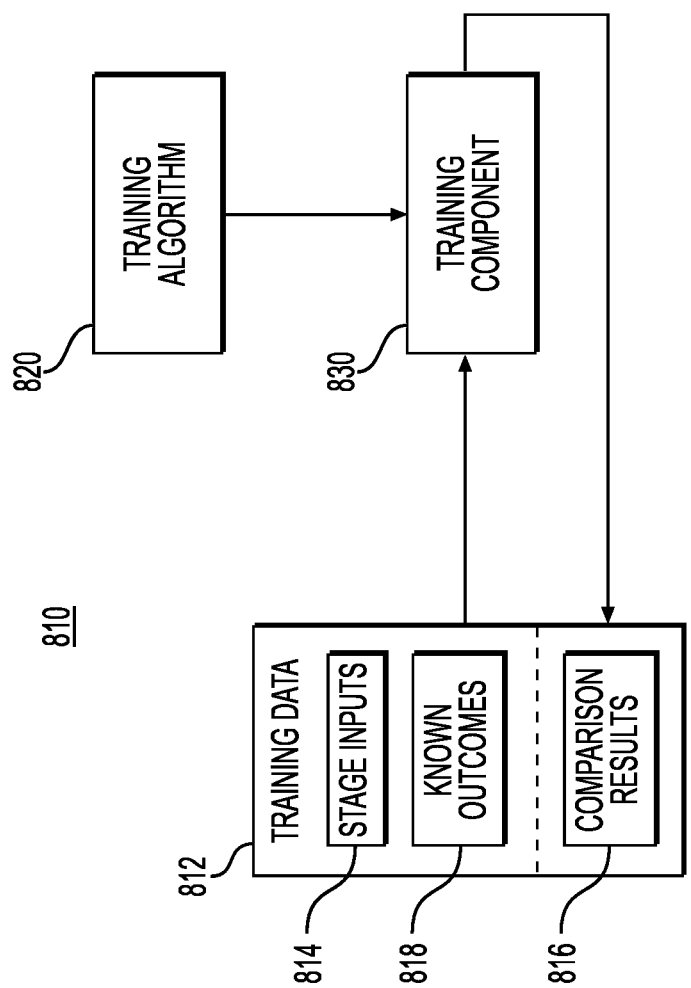
FIG. 8 depicts a data flow for training a machine learning model, according to one or more embodiments.

One or more implementations disclosed herein include a machine learning model. A machine learning model disclosed herein may be trained using the data flow 810 of FIG. 8. As shown in FIG. 8, training data 812 may include one or more of stage inputs 814 and known outcomes 818 related to a machine learning model to be trained. The stage inputs 814 may be from any applicable source including upstream data sources, data aggregators, rule application modules, rule output modules, an output from a step (e.g., one or more outputs from a step from flowchart 300 of FIG. 3 or flowchart 500 of FIG. 5). The known outcomes 818 may be included for machine learning models generated based on supervised or semi-supervised training. An unsupervised machine learning model may not be trained using known outcomes 818. Known outcomes 818 may include known or desired outputs for future inputs similar to or in the same category as stage inputs 814 that do not have corresponding known outputs.

The training data 812 and a training algorithm 820 may be provided to a training component 830 that may apply the training data 812 to the training algorithm 820 to generate a machine learning model. According to an implementation, the training component 830 may be provided comparison results 816 that compare a previous output of the corresponding machine learning model to apply the previous result to re-train the machine learning model. The comparison results 816 may be used by the training component 830 to update the corresponding machine learning model. The training algorithm 820 may utilize machine learning networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, and/or discriminative models such as Decision Forests and maximum margin methods, or the like.

In general, any process or operation discussed in this disclosure that is understood to be computer-implementable, such as the process illustrated in FIGS. 3, and 5, may be performed by one or more processors of a computer system, such any of the systems or devices in the computing environments of FIGS. 1A, 2, and 4 as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices, such as one or more of the systems or devices in of FIGS. 1A, 2, and 4. One or more processors of a computer system may be included in a single computing device or distributed among a plurality of computing devices. One or more processors of a computer system may be connected to a data storage device. A memory of the computer system may include the respective memory of each computing device of the plurality of computing devices.

FIG. 9 is a simplified functional block diagram of a computer system 900 that may be configured as a device for executing the processes of FIGS. 1A, 2, and 4, according to exemplary embodiments of the present disclosure. FIG. 9 is a simplified functional block diagram of a computer system that may generate interfaces and/or another system according to exemplary embodiments of the present disclosure. In various embodiments, any of the systems (e.g., computer system 900) herein may be an assembly of hardware including, for example, a data communication interface 920 for packet data communication. The computer system 900 also may include a central processing unit ("CPU") 902, in the form of one or more processors, for executing program instructions. The computer system 900 may include an internal communication bus 908, and a storage unit 906 (such as ROM, HDD, SDD, etc.) that may store data on a computer readable medium 922, although the computer system 900 may receive programming and data via network communications. The computer system 900 may also have a memory 904 (such as RAM) storing instructions 924 for executing techniques presented herein, although the instructions 924 may be stored temporarily or permanently within other modules of computer system 900 (e.g., processor 902 and/or computer readable medium 922). The computer system 900 also may include input and output ports 912 and/or a display 910 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to transmitting data, it should be appreciated that the presently disclosed embodiments may be applicable to any environment, such as a desktop or laptop computer, a mobile device, a wearable device, an application, or the like. Also, the presently disclosed embodiments may be applicable to any type of Internet protocol.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented downstream execution method for individual rule-based flagging of upstream data quality errors, comprising:
    receiving upstream data, corresponding to an overall population of users, from a plurality of sources each source selected from one of a relational database, a non-relational database, or a file system;
    identifying a downstream task to be executed, the downstream task being associated with at least a portion of the overall population of users;
    applying a plurality of rules to the upstream data, each of said plurality of rules determining the inclusion or exclusion of a portion of the overall population of users;
    generating a plurality of outputs including at least one output for each of the plurality of rules applied to the upstream data, each of the plurality of outputs being associated with a corresponding rule of the plurality of rules;
    identifying a tagged population of users based on the plurality of outputs, the tagged population being a subset of the overall population of users;
    determining that at least one of the plurality of outputs does not meet a corresponding rule threshold; and
    activating an execution of the downstream task for the tagged population of users after at least one of (i) updating the corresponding rule threshold or (ii) overriding an error generated based on the determining that the at least one of the plurality of outputs does not meeting the corresponding rule threshold.

2. The method of claim 1, further comprising generating a graphical representation of the at least one of the plurality of outputs that does not meet the corresponding rule threshold, the graphical representation comprising an indication of the corresponding rule threshold.

3. The method of claim 1, wherein the upstream data comprises one or more of user account information, user behavior information, user action information, user status, or user changes.

4. The method of claim 1, wherein the upstream data comprises one or more of a system status, a system profile, and a system action.

5. The method of claim 1, wherein the corresponding rule threshold is generated by a machine learning model.

6. The method of claim 5, wherein the machine learning model is updated based on the execution of the downstream task.

7. The method of claim 5, wherein the machine learning model is generated based on training data comprising data from past execution of the downstream task.

8. The method of claim 5, wherein the machine learning model is generated based on training data from attributes associated with the corresponding rule.

9. The method of claim 1, further comprising organizing the upstream data based at least on a type of at least a subset of the upstream data.

10. The method of claim 9, wherein the organized upstream data associates a plurality of data points with a corresponding user.

11. The method of claim 1 further comprising modifying a first corresponding threshold of a first rule independently from modifying a second corresponding threshold of a second rule.

12. A computer-implemented downstream execution method, comprising:
    receiving source data from each of a plurality of sources each source selected from one of a relational database, a non-relational database, or a file system;
    identifying a downstream task to be executed, the downstream task being associated with at least a portion of an overall population of users;
    applying a plurality of rules to each of the source data from the plurality of sources, each of said plurality of rules being either inclusive or exclusive and selected from a pool of available rules or generated based on the downstream task, each or a subset of the plurality of rules being applied at each of the source data from the plurality of sources;
    generating a plurality of outputs including at least one output for each of the plurality of rules applied to each of the source data;
    determining that at least one of the plurality of outputs from a first source of the plurality of sources does not meet a corresponding rule threshold;
    flagging the first source based on the at least one of the plurality outputs not meeting the corresponding rule threshold;
    identifying a plurality of usable sources from the plurality of sources, the usable sources excluding the first source;
    identifying a tagged population of users based on the plurality of outputs associated with the usable sources, the tagged population of users being a subset of the overall population of users; and
    activating an execution of the downstream task for the tagged population of users.

13. The method of claim 12, further comprising:
identifying a last known valid source; and
including the last known valid source in the plurality of usable sources.

14. The method of claim 13, wherein the last known valid source is a previous version of the first source.

15. The method of claim 14, wherein the last known valid source previously met the corresponding rule threshold.

16. The method of claim 12, wherein more than one of the plurality of sources comprise data about a same user.

17. The method of claim 12, wherein the corresponding rule threshold is generated by a machine learning model.

18. The method of claim 12, further comprising organizing the source data based at least on a type of at least a subset of the source data.

19. The method of claim 18, wherein the organized source data associates a plurality of data points with a corresponding user.

20. A system comprising:
a data storage device storing processor-readable instructions; and
a processor operatively connected to the data storage device and configured to execute the instructions to perform operations that include:
receiving source data from each of a plurality of sources each source selected from one of a relational database, a non-relational database, or a file system;
identifying a downstream task to be executed, the downstream task being associated with at least a portion of an overall population of users;
applying a plurality of rules to each of the source data from the plurality of sources, each of said plurality of rules being either inclusive or exclusive and selected from a pool of available rules or generated based on the downstream task, each or a subset of the plurality of rules being applied at each of the source data from the plurality of sources;
generating a plurality of outputs including at least one output for each of the plurality of rules applied to each of the source data;
determining that at least one of the plurality of outputs from a first source of the plurality of sources does not meet a corresponding rule threshold;
flagging the first source based on the at least one of the plurality outputs not meeting the corresponding rule threshold;
identifying a plurality of usable sources from the plurality of sources, the usable sources excluding the first source;
identifying a tagged population of users based on the plurality of outputs associated with the usable sources, the tagged population of users being a subset of the overall population of users; and
activating an execution of the downstream task for the tagged population of users.

* * * * *